United States Patent
Hingorani et al.

(10) Patent No.: US 10,518,206 B1
(45) Date of Patent: Dec. 31, 2019

(54) SYSTEMS AND METHODS OF PREDICTING LIFE OF A FILTER IN AN HVAC SYSTEM

(71) Applicant: Lennox industries Inc., Richardson, TX (US)

(72) Inventors: Sanjeev Hingorani, Gainesville, FL (US); Henry Greist, Gainesville, FL (US); Peter Hrejsa, Frisco, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 16/004,129

(22) Filed: Jun. 8, 2018

(51) Int. Cl.
| | |
|---|---|
| G08B 21/00 | (2006.01) |
| B01D 46/00 | (2006.01) |
| F24F 3/16 | (2006.01) |
| G08B 21/18 | (2006.01) |
| G05B 19/042 | (2006.01) |

(52) U.S. Cl.
CPC ........ B01D 46/0086 (2013.01); F24F 3/1603 (2013.01); G05B 19/042 (2013.01); G08B 21/182 (2013.01); B01D 2273/18 (2013.01); B01D 2279/50 (2013.01); G05B 2219/2614 (2013.01)

(58) Field of Classification Search
CPC ............ B01D 46/0086; B01D 2273/18; B01D 2279/50; F24F 3/1603; G05B 19/042; G05B 2219/2614; G08B 21/182
USPC ....................................................... 340/679
See application file for complete search history.

(56) References Cited

U.S. PATENT DOCUMENTS

| | | | | |
|---|---|---|---|---|
| 6,778,864 B1* | 8/2004 | Bugli | ...................... | G06F 17/50 700/17 |
| 2001/0045159 A1* | 11/2001 | Johnson | ............... | B01D 46/002 95/26 |
| 2003/0010043 A1* | 1/2003 | Ferragut, II | ............ | F25D 29/00 62/126 |
| 2005/0247194 A1* | 11/2005 | Kang | ................. | B01D 46/0086 95/19 |
| 2013/0288585 A1* | 10/2013 | Hoke | ................... | B60H 3/0616 454/75 |
| 2015/0254958 A1* | 9/2015 | Sherman | ................ | G08B 21/18 340/607 |
| 2016/0290668 A1* | 10/2016 | Taylor | ...................... | F24F 11/30 |

* cited by examiner

Primary Examiner — Naomi J Small
(74) Attorney, Agent, or Firm — Baker Botts L.L.P.

(57) ABSTRACT

A method includes initiating, by a controller of a heating, ventilation, and air conditioning ("HVAC") system, a filter calibration procedure, curve fitting a first line based on a plurality of static pressure measurements and corresponding flowrates of air, and generating a second line based on the first line. The method further includes determining a first static pressure measurement sensed by at least one sensor in response to determining that a first flowrate of air has been moved by the at least one blower and comparing the first static pressure value to a predicted static pressure value of the second line, the predicted static pressure value corresponding to the first flowrate of air. The method further includes determining that an air filter of the HVAC system has no more usable life in response to determining that the first static pressure value is greater than the predicted static pressure value.

20 Claims, 4 Drawing Sheets

SYSTEMS AND METHODS OF PREDICTING LIFE OF A FILTER IN AN HVAC SYSTEM

TECHNICAL FIELD

This disclosure relates generally to filters of a heating, ventilation, and air conditioning ("HVAC") system. More specifically, this disclosure relates to a systems and methods of predicting the life of a filter of an HVAC system.

BACKGROUND

Heating, ventilation, and air conditioning ("HVAC") systems can be used to regulate the environment within an enclosed space. Typically, an air blower is used to pull air from the enclosed space into the HVAC system through ducts and push the air back into the enclosed space through additional ducts after conditioning the air (e.g., heating, cooling or dehumidifying the air). Various types of HVAC systems, such as residential and commercial, may be used to provide conditioned air for enclosed spaces.

Each HVAC system typically includes a HVAC controller that directs the operation of the HVAC system. The HVAC controller can direct the operation of a conditioning unit, such as an air conditioner or a heater, to control the temperature of the enclosed space. In addition to conditioning the air, HVAC systems may also filter the air. Typically, HVAC systems employ one or more air filters that capture airborne pollutants (e.g., dust, debris).

SUMMARY OF THE DISCLOSURE

According to one embodiment, a heating, ventilation, and air conditioning ("HVAC") system includes at least one blower, an air filter, at least one sensor, and at least one controller. The at least one blower is operable to move air, the air filter is configured to entrap airborne pollutants, and the at least one sensor is configured to sense a static pressure of the HVAC system. The at least one controller is operable to initiate a filter calibration procedure whereby the static pressure is measured at a plurality of predetermined points, each predetermined point being a specified flowrate of air moved by the at least one blower. The at least one controller is further operable to curve fit a first line based on the static pressure measurements and the corresponding flowrates of air, the first line indicating values of static pressure and corresponding flowrates of air of a clean filter, and generate a second line based on the first line, the second line indicating values of static pressure and corresponding flowrates of air of a dirty filter. The at least one controller is further operable to determine a first static pressure measurement of the HVAC system in response to determining that a first flowrate of air has been moved by the at least one blower and compare the first static pressure value to a predicted static pressure value of the second line, the predicted static pressure value corresponding to the first flowrate of air. The at least one controller is further operable to determine that the air filter has no more usable life in response to determining that the first static pressure value is greater than the predicted static pressure value.

According to another embodiment, a method includes initiating, by a controller of a heating, ventilation, and air conditioning ("HVAC") system, a filter calibration procedure whereby static pressure of the HVAC system is measured at a plurality of predetermined points, each predetermined point being a specified flowrate of air moved by at least one blower of the HVAC system, the static pressure measured by at least one sensor of the HVAC system. The method further includes curve fitting, by the controller, a first line based on the static pressure measurements and the corresponding flowrates of air, the first line indicating values of static pressure and corresponding flowrates of air of a clean filter, and generating a second line based on the first line, the second line indicating values of static pressure and corresponding flowrates of air of a dirty filter. The method further includes determining a first static pressure measurement of the HVAC system in response to determining that a first flowrate of air has been moved by the at least one blower and comparing the first static pressure value to a predicted static pressure value of the second line, the predicted static pressure value corresponding to the first flowrate of air. The method further includes determining that an air filter of the HVAC system has no more usable life in response to determining that the first static pressure value is greater than the predicted static pressure value.

According to yet another embodiment, a controller for a heating, ventilation, and air conditioning ("HVAC") system is operable to initiate a filter calibration procedure whereby static pressure of the HVAC system is measured at a plurality of predetermined points, each predetermined point being a specified flowrate of air moved by at least one blower of the HVAC system, the static pressure measured by at least one sensor of the HVAC system. The controller is further operable to curve fit a first line based on the static pressure measurements and the corresponding flowrates of air, the first line indicating values of static pressure and corresponding flowrates of air of a clean filter, and generate a second line based on the first line, the second line indicating values of static pressure and corresponding flowrates of air of a dirty filter. The controller is further operable to determine a first static pressure measurement of the HVAC system in response to determining that a first flowrate of air has been moved by the at least one blower and compare the first static pressure value to a predicted static pressure value of the second line, the predicted static pressure value corresponding to the first flowrate of air. The controller is further operable to determine that an air filter of the HVAC system has no more usable life in response to determining that the first static pressure value is greater than the predicted static pressure value, Certain embodiments may provide one or more technical advantages. For example, an embodiment of the present disclosure may result in maximizing the usable life of an air filter. As another example, an embodiment of the present invention notifies an operator of the HVAC system when the air filter has no remaining usable life. As such, the operator may be prompted to replace the dirty air filter with a clean one thereby increasing the efficiency of operating the HVAC system and/or providing cleaner air to the enclosed space. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

Air filters generally filter pollutants such as dust, allergens, and dander from the air. Typically, air filters are installed within air vents of an enclosed space and entrap pollutants as air flows through the air filter. Over time, the air filter becomes soiled with pollutants, resulting in an increase in the static pressure of the HVAC system and reduced efficiency of both the HVAC system and the air filter. Accordingly, an air filter has a usable life that, upon expiration, causes a number of inefficiencies. Conventional wisdom calls for residential air filters to be replaced every three to twelve months (depending on the filter type and recommendation from the filter manufacturer). However, the rate at which an air filter becomes soiled differs based on a number of factors such as the number of occupants/pets within an enclosed space and the level of pollution and/or construction in an environment of the enclosed space. Thus, some air filters may need to be replaced more often than manufacturers recommend and some air filters may need to be replaced less often than the manufacturers recommend. As a result, some air filters may be replaced before they actually need be and others may be replaced later than they should be replaced.

Most HVAC systems do not have the intelligence to alert an operator to replace an air filter. Instead, operators themselves must remember to change the air filter. For HVAC systems that are programmed to provide such an alert, the alert is generated based on a timer (e.g., such as a 3-month time and/or a blower run time timer). Because such alerts do not analyze whether the air filter has remaining usable life, these solutions may cause waste (e.g., by not maximizing the usable life of a filter), reduce the quality of the air of the enclosed space, and/or the efficiency of the HVAC system.

The present disclosure recognizes an HVAC system provided with the operational intelligence to determine whether an air filter has usable life remaining. In certain embodiments, the HVAC system determines the usable life of an air filter by monitoring the static pressure of the HVAC system. In some embodiments, the logic to perform such intelligent operation is stored to one or more storage devices of controller 140. As provided above, being able to determine the usable life of an air filter is associated with a variety of benefits including less waste, filtration maximization, improved air quality, and increased efficiency of operating an HVAC system.

Figure 1:
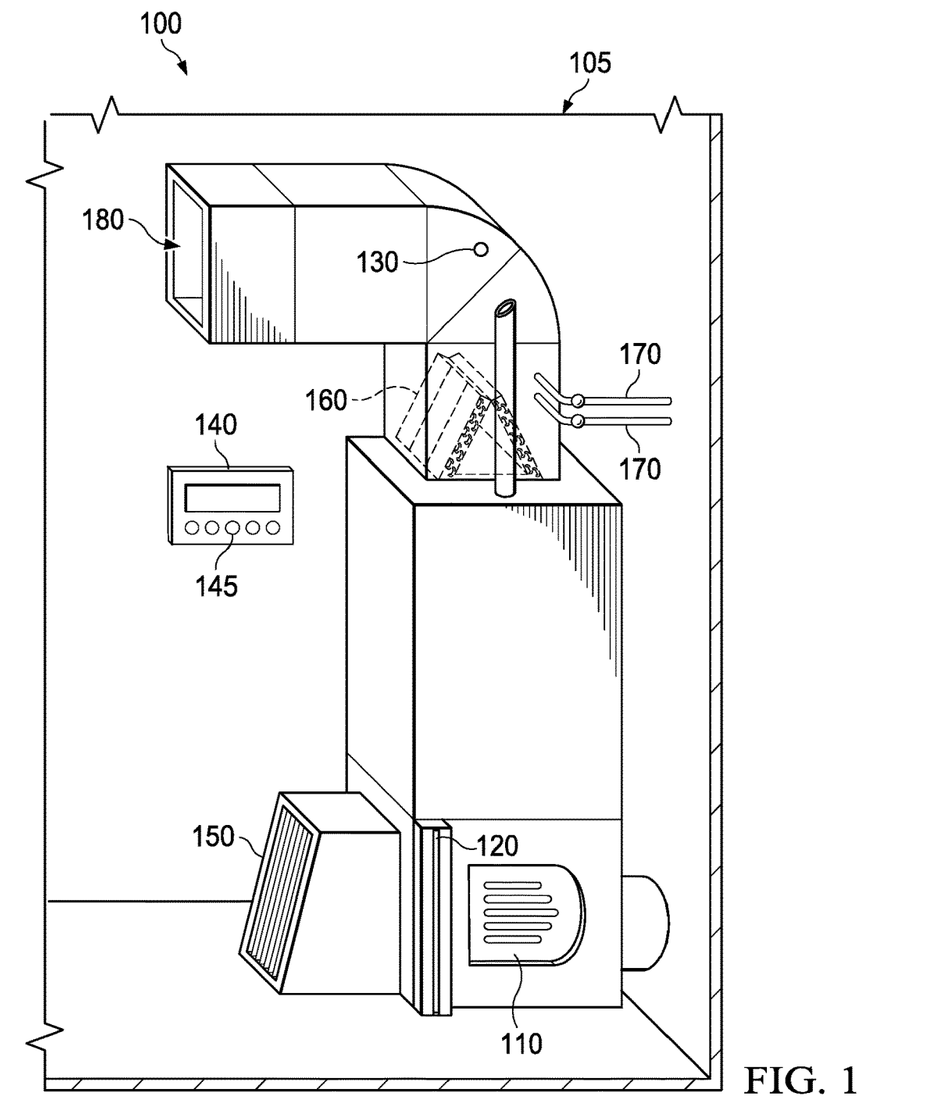
FIG. 1 illustrates an example of an air handling unit of a heating, ventilation, and air conditioning ("HVAC") system, according to certain embodiments.

FIG. 1 illustrates an example of an HVAC system 100. HVAC system 100 includes at least one blower 110, an air filter 120, at least one sensor 130, and at least one controller 140. As depicted in FIG. 1, HVAC system 100 may also include a return air duct 150, an evaporator coil 160, refrigerant tubing 170, and an air supply duct 180. In some embodiments, air is sucked out an enclosed space 105 through return air duct 150 and is filtered by air filter 120. The filtered air is generally pushed by blower 110 across conventional conditioning elements (e.g., evaporator coil 160 and refrigerant tubing 170) before it is circulated back into enclosed space 105 via air supply duct 180.

Blower 110 is configured to move air through HVAC system 100 (e.g., via return air duct 150 and air supply duct 180). In some embodiments, blower 110 is driven by a motor. Blower 110 may be operated at one or more speeds. This disclosure recognizes that operating blower 110 at a higher speed provides an increased air flow rate relative to operating blower 110 at a lower speed. In some embodiments, controller 110 controls the operation of blower 110. As such, controller 110 may instruct blower 110 to power on, power off, increase speed, and/or decrease speed. For example, controller 110 may instruct blower 110 to power on (from an off mode) and operate at a speed corresponding to an air flow rate of 400 cubic feet per minute ("CFM"). Controller 110 may further instruct blower 110 to increase speed (e.g., operate at a speed corresponding to an air flow rate of 600 CFM) and/or decrease speed (e.g., operate at a speed corresponding to an air flow rate of 200 CFM).

As described above, the air moved by blower 110 is eventually directed through air filter 120 via return air duct 150. Air filter 120 is configured to increase the quality of the air circulating in HVAC system 100 by entrapping pollutants. Pollutants may include particulates such as dust, pollen, allergens (e.g., dust mite and cockroach), mold, and dander. Pollutants may also include gases and odors such as gas from a stovetop, tobacco smoke, paint, adhesives, and/or cleaning products. Over time, as air filter 120 collects pollutants, air filter 120 becomes soiled and has no usable life left in it. This disclosure recognizes that an air filter having no usable life has reduced effectiveness at improving air quality relative to an air filter having usable life. Additionally, this disclosure recognizes that an air filter having no usable life increases the static pressure of the HVAC system, resulting in a higher cost to HVAC system 100 as compared to operating the HVAC system with an air filter having usable life. For example, blower 110 may require 0.925 KW of energy to move 1365 CFM when an air filter having usable life is installed within HVAC system 100 but requires 1.07 KW of energy to move the same amount of air when an air filter having no usable life is installed within HVAC system 100. To avoid these and other disadvantages, it is recommended that air filters are cleaned and/or replaced when they have no usable life left.

HVAC system 100 may also include one or more sensors 130. Sensors 130 may be configured to sense information about HVAC system 100, about enclosed space 105, and/or about components of HVAC system 100. As an example, HVAC system 100 may include a sensor 130 configured to sense data about a static pressure of HVAC system 100. As another example, one or more sensors may be configured to sense data related to a temperature of enclosed space 105. As yet another example, one or more sensors may be configured to sense data regarding a temperature and/or pressure leaving a condenser of HVAC system 100. Although this disclosure describes specific types of sensors, HVAC system 100 may include any other type and any suitable number of sensors 130.

As provided above, HVAC system 100 includes at least one controller 140 that directs the operations of HVAC system 100. Controller 140 may be communicably coupled to one or more components of HVAC system 100. For example, controller 140 may be configured to receive data sensed by sensors 130. As another example, controller 140 may be configured to provide instructions. to one or more components of refrigeration system 100 (e.g., blower 110). Controller 140 may be configured to provide instructions via any appropriate communications link (e.g., wired or wireless) or analog control signal. An example of controller 140 is further described below with respect to FIG. 5. In some embodiments, controller 140 includes or is a computer system.

As depicted in FIG. 1, controller 140 is located within a wall-mounted thermostat in enclosed space 105. Operation of HVAC system 100 may be controlled by an operator who programs HVAC system 100 using one or more buttons 145 on the thermostat. For example, HVAC system 100 may be programmed to initiate a cooling cycle in response to determining user input via buttons 145. As another example, HVAC system 100 may be programmed to initiate a filter calibration procedure in response to determining user input via buttons 145.

Figure 2:
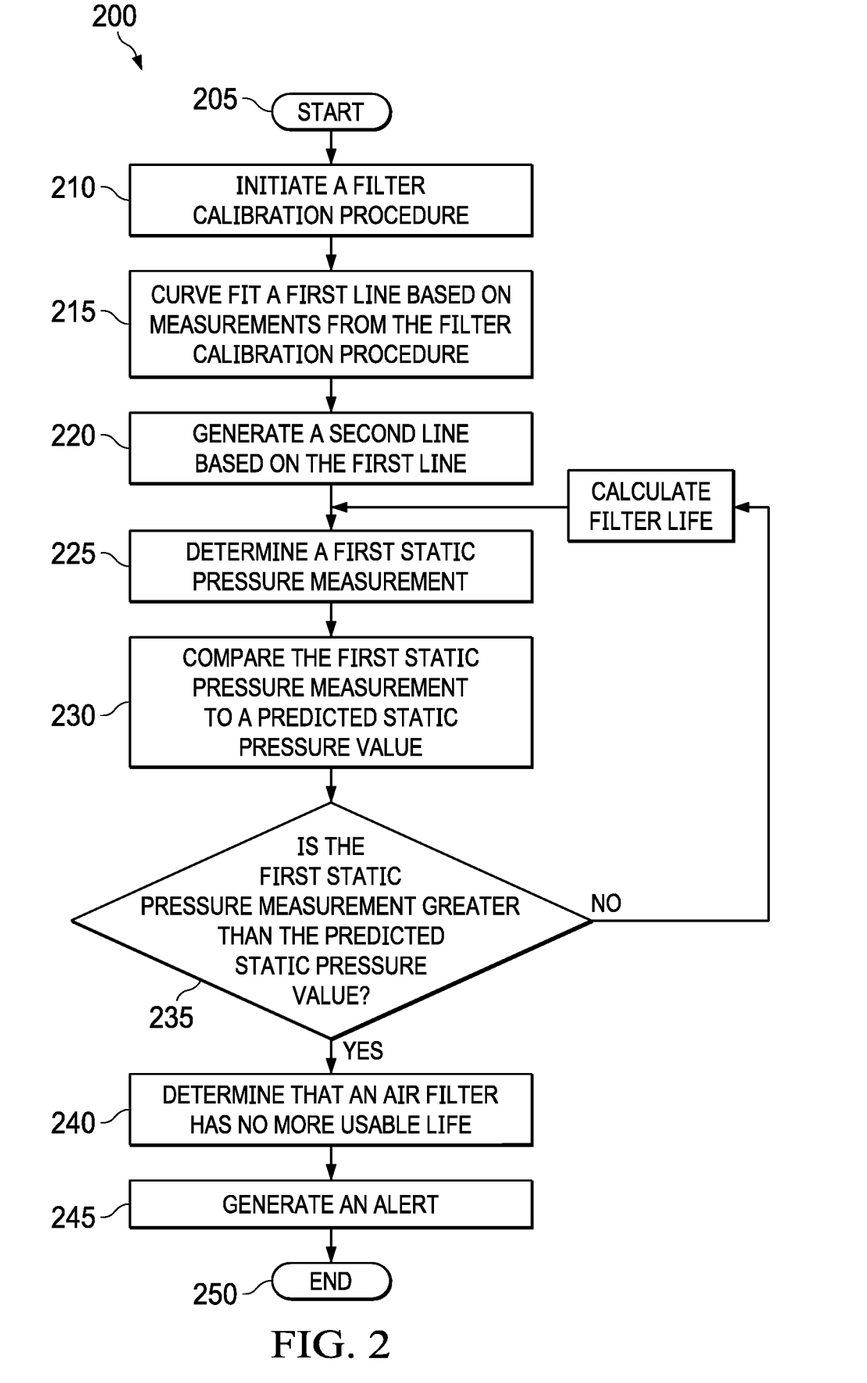
FIG. 2 is a flow chart illustrating a method of operation for the HVAC system of FIG. 1, according to certain embodiments.

FIG. 2 illustrates a method 200 of operation for HVAC system 100. In some embodiments, the method 200 may be implemented by a controller of dehumidification system 200 (e.g., controller 140 of FIG. 1). As described above, method 200 may be stored on a computer readable medium, such as a memory of controller 140 (e.g., memory 520 of FIG. 5), as a series of operating instructions that direct the operation of a processor (e.g., processor 530 of FIG. 5). Method 200 may be associated with efficiency benefits such as reduced power consumption relative to conventional methods of operating HVAC system 100. In some embodiments, the method 200 begins in step 205 and continues to step 210.

Figure 3:
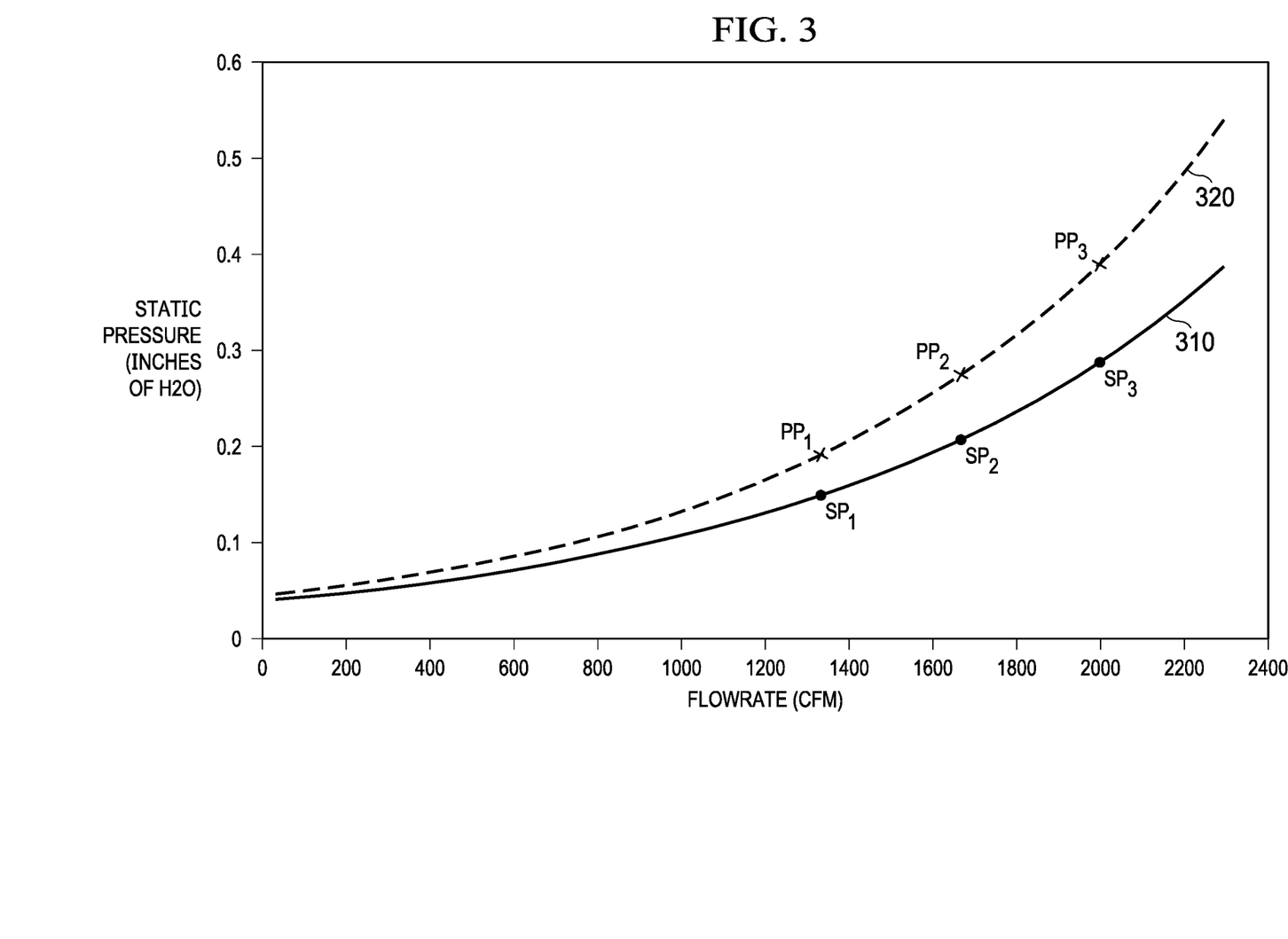
FIG. 3 is an example graph illustrating steps of the method of FIG. 2, according to certain embodiments.

At step 210, controller 140 initiates a filter calibration procedure. In some embodiments, the filter calibration procedure includes measuring the static pressure of HVAC system 100 at a plurality of predetermined air flowrates. For example, filter calibration procedure may provide for HVAC system 100 to take static pressure measurements at 1333.33 CFM, 1666.67 CFM, and 2000 CFM from a baseline. As used herein, a "baseline" may refer to a flowrate of air from which other flowrates are determined (e.g., 1,333.33 CFM is 1,333.33 from a baseline 0 CFM). FIG. 3 illustrates examples of static pressure measurements taken at a plurality of air flowrates (e.g., see $SP_1$, $SP_2$, and $SP_3$ of FIG. 3). In some embodiments, a baseline may be set as soon as the filter calibration procedure is initiated. In some embodiments, the static pressure of HVAC system 100 is measured via sensors 130. This disclosure recognizes that the filter calibration procedure may be initiated in any suitable way including, but not limited to, installation of air filter 120 in an air duct of HVAC system 100 and user input (e.g., depression of button 245 on a thermostat). After completing the filter calibration procedure, the method 200 may proceed to step 215.

At step 215, controller 140 curve fits a first line based on the measurements taken during the filter calibration procedure. As an example, controller may generate an equation based on three or more sensed static pressure values measured at different air flowrates (e.g., 1,333.33 CFM, 1,666.67 CFM, and 2000.00 CFM). An example of such a curved-fit line is line 310 (indicated in dotted line) of FIG. 3. As depicted in FIG. 3, line 310 is curve fit based on static pressure ("SP") points $SP_1$, $SP_2$, and $SP_3$. Points along first line 310 may represent values of a "clean" filter at a plurality of static pressure measurements and corresponding air flowrates. Although this disclosure may refer to first line 310 as a "clean filter" line, this disclosure recognizes that air filter 120 may be partially or fully soiled when installed. In some embodiments, the method 200 proceeds to a step 220 after curve fitting first line 310.

At step 220, controller 140 generates a second line based on points of the first line. In some embodiments, the points along the second line are scaled from points along the first line using fan laws, a predetermined relationship or a system-derived relationship. An example of such scaled points are the three predicted points "PP" of FIG. 3 (see $PP_1$, $PP_2$, and $PP_3$ of FIG. 3). The second line may be curve fit from the predicted points. An example of the generated second line is second line 320 (illustrated in dashed line) of FIG. 2. Points along second line 320 may represent predicted values of a "dirty" filter at a plurality of static pressure measurements and corresponding air flowrates. Second line 320 may be represented by an equation. After generating the second line, the method 200 may proceed to step 225.

At step 225, controller 140 determines a first static pressure measurement of HVAC system 100. The first static pressure measurement may be taken at a predetermined flowrate of air. For example, the first static pressure measurement may be determined at 1500 CFM from the baseline. In some embodiments, the first static pressure measurement is sensed by sensor 130. In other embodiments, the first static pressure measurement is calculated based on other values sensed by sensors 130 (e.g., 81.25% of max CFM of the HVAC unit). After determining the first static pressure measurement, the method 200 may proceed to step 230.

At step 230, controller 140 compares the first static pressure measurement to a predicted static pressure value. In some embodiments, controller 140 compares the first static pressure measurement to the predicted static pressure value at the predetermined flowrate of air. For example, if the first static pressure measurement was taken at 1500 CFM from the baseline, controller 140 compares the first static pressure measurement to a predicted static pressure value at 1500 CFM. Taking the measured pressures and predicted pressures of FIG. 4 as an example, controller 140 may determine that at 1500 CFM, the first static pressure measurement of HVAC system 100 is 0.18 inches of water (see $MP_1$ of FIG. 4) and the predicted pressure of second line (dirty filter line) 320 is about 0.22 inches of water. As such, controller 140 may compare 0.18 inches of water ($MP_1$) to 0.22 inches of water ($PP_{not\ illustrated}$).

At step 235, controller 140 determines whether the first static pressure measurement is greater than the predicted static pressure measurement. Taking the above example, controller 140 determines whether 0.18 inches of water ($MP_1$) is greater than 0.22 inches of water ($PP_{not\ illustrated}$). If controller 140 determines that the first static pressure measurement is greater than the predicted static pressure measurement, the method 200 may proceed to a step 240. If controller 140 instead determines that the first static pressure measurement is equal to or less than the predicted static pressure measurement, the method 200 may proceed to step 230.

At step 240, controller 140 determines that air filter 120 has no more usable life. In some instances, the method 200 proceeds to step 245 in response to making such determination. At step 245, controller 140 generates an alert. In some embodiments, the alert may be a visual alert such as a text-based alert for display on a thermostat and/or a user device (e.g., a cell phone). In some embodiments, the alert may be an audio alert (e.g., a beeping sound) from a thermostat and/or user device. Although this disclosure has described particular types of alerts, this disclosure recognizes any suitable alert. In some instances, an operator of HVAC system 100 takes action in response to receiving the alert generated at step 245. As an example, an operator of HVAC system 100 may replace and/or clean air filter 120 in response to receiving the alert generated at step 245. As another example, an operator of HVAC system may depress button 245 on wall-mounted thermostat in order to re-initiate the filter calibration procedure. In some embodiments, the method 200 proceeds to end step 250 after generating the alert.

In some other embodiments, controller 120 performs one or more additional steps. For example, controller may perform one or more additional steps instead of proceeding to end step 250. In such an example, controller 120 may continue to monitor the static pressure of HVAC system 100 after determining at step 235 that the first static pressure measurement is equal to or less than the predicted static pressure measurement. In some embodiments, controller 140 may perform further comparison and determination steps. For example, controller 150 may determine a static pressure of HVAC system 140 at 1800 CFM and compare the static pressure to a predicted value of static pressure at 1800 CFM. Taking the values of FIG. 4 as an example, controller may determine that the static pressure of HVAC system 100 at 1800 CFM is about 0.23 inches of water (see $MP_2$ of FIG. 4) and compare it to a predicted value of static pressure at 1800 CFM (about 0.31 inches of water). Controller 140 may further determine that the measured value of static pressure (about 0.23 inches of water) is less than the predicted value of static pressure at 1800 CFM (about 0.31 inches of water). Controller 140 may continue to perform such determination and comparison steps as necessary. For example, controller 140 may continue to perform these determination and comparison steps until controller 140 determines that a measured static pressure at $CFM_X$ is greater than a predicted static pressure at $CFM_X$. An example of such determination is depicted in FIG. 4 when the measured static pressure at 2200 CFM (see $MP_6$ having a static pressure of about 0.52 inches of water) exceeds the corresponding predicted static pressure (about 0.485 inches of water) at 2200 CFM.

Although this disclosure describes and depicts detecting a static pressure above a predicted pressure, this disclosure also recognizes detecting whether the static pressure of the HVAC system is stagnant or declining. In some cases, stagnant or declining measurements of static pressure of HVAC system 100 may indicate that an air filter 120 having no usable life is installed within HVAC system 100. This may occur when, for example, an operator attempts to fool HVAC system 100 by initiating the calibration procedure without replacing/cleaning air filter 120. In such circumstances, HVAC system 100 may receive substantially similar static pressure measurements (e.g., +/−10% of a first measured static pressure) at a plurality of air flowrates (e.g., 1,333.33 CFM, 1,666.67 CFM, 2000.00 CFM) during the filter calibration procedure, and then continue to receive substantially similar static pressure measurements after completing the filter calibration procedure. The HVAC system 100 may be further programmed to generate an alert in response to determining that the static pressure of the HVAC system is not increasing at an expected rate (e.g., determining that the static pressure of the HVAC system is +/−10% of 0.45 inches of water when measured at 1200 CFM, 1600 CFM, 2000 CFM, and 2400 CFM).

Figure 4:
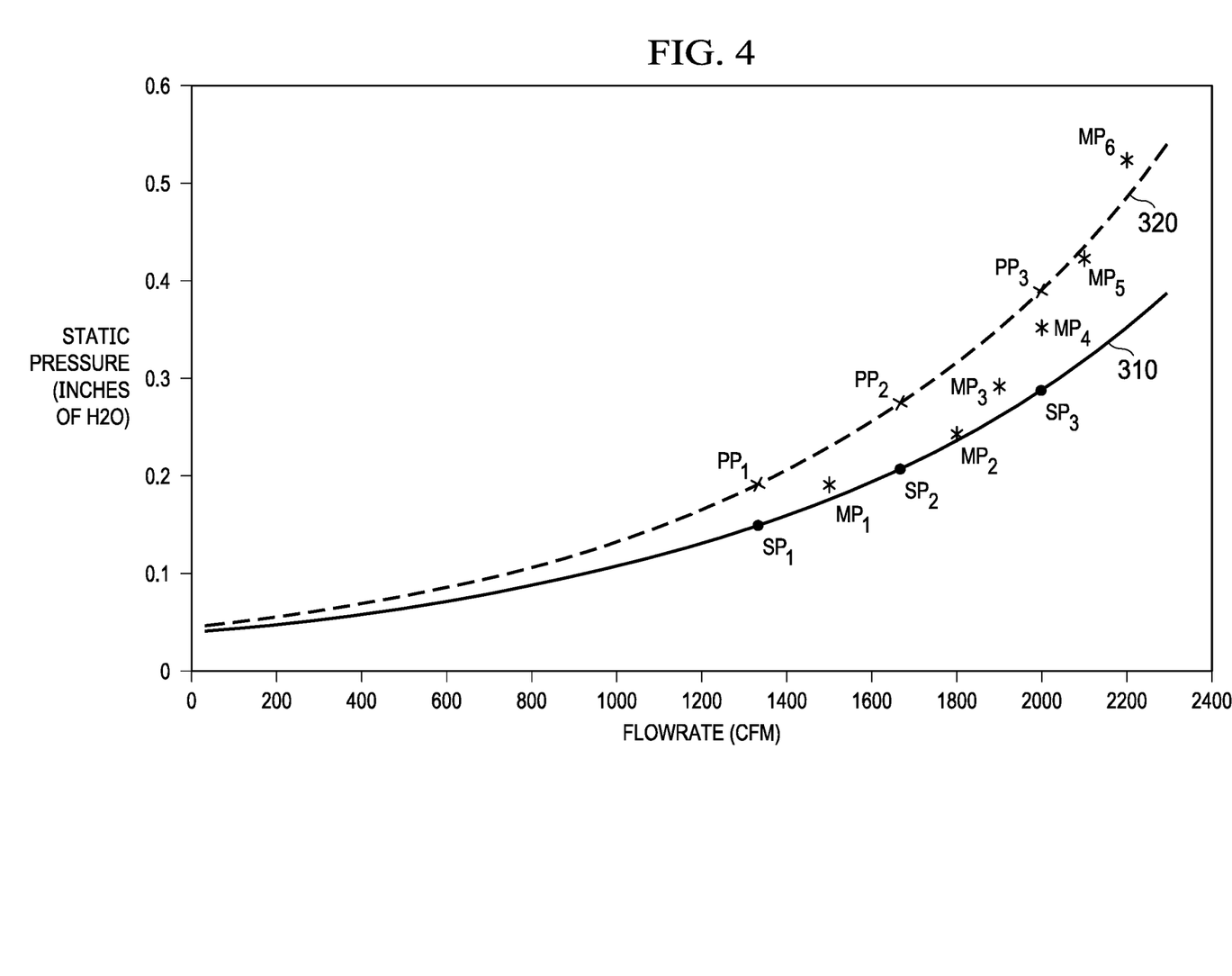
FIG. 4 is an example graph illustrating additional steps of the method of FIG. 2, according to certain embodiments.

FIGS. 3 and 4 are graphs illustrating one or more steps of method 200. For example, FIG. 3 illustrates static pressure measurements taken during the filter calibration procedure described above in reference to step 210, curve-fitting a first line from the static pressure measurements taken during the filter calibration procedure as described above in reference to step 220, and generating a second line based on the first line as described above in reference to step 230. As depicted in FIG. 3, three static pressure measurements are taken at three different flowrates of air: $SP_1$, $SP_2$, and $SP_3$. As illustrated, $SP_1$ is about 0.15 inches of water at 1,333.33 CFM, $SP_2$ is about 0.21 inches of water at 1,666.67 CFM, and $SP_3$ is about 0.29 inches of water at 2000.00 CFM. First line 310 of FIG. 3 is determined based on the static pressure measurements taken during the filter calibration procedure. First line 310 may be represented as an equation (e.g., $y=5.06437E-08x^2+4.27026E-0.5x$). As discussed above, line 310 may represent values of a "clean" filter at a plurality of static pressure measurements and corresponding air flowrates. FIG. 3 also illustrates a plurality of predicted static pressures: $PP_1$, $PP_2$, and $PP_3$. As illustrated, $PP_1$ is about 0.19 inches of water at 1,333.33 CFM, $PP_2$ is about 0.28 inches of water at 1,666.67 CFM, and $PP_3$ is about 0.39 inches of water at 2000.00 CFM. In some embodiments, the values of $PP_1$, $PP_2$, and $PP_3$ are scaled from the values of $SP_1$, $SP_2$, and $SP_3$, respectively, using fan laws. In some embodiments, the values of $PP_1$, $PP_2$, and $PP_3$ are used to generate second line 320. Second line 320 may be represented as an equation (e.g., $y=7.56437E-08x2+4.27026E-05x$).

FIG. 4 illustrates first line 310 and second line 320 of FIG. 3 in addition to illustrating a plurality of static pressure measurements taken at predetermined flowrates of air (see $MP_1$, $MP_2$, $MP_3$, $MP_4$, $MP_5$, and $MP_6$). As illustrated, $MP_1$ is about 0.18 inches of water at 1500.00 CFM, $MP_2$ is about 0.23 inches of water at 1800.00 CFM, $MP_3$ is about 0.275 inches of water at 1900.00 CFM, $MP_4$ is about 0.35 inches of water at 2000 CFM, $MP_5$ is about 0.42 inches of water at 2100 CFM, and $MP_6$ is about 0.52 inches of water at 2200 CFM. As described above in reference to steps 225, controller 140 determines the static pressure of HVAC system 100 as blower 110 moves predetermined flowrates of air. These values may then be compared against either values of first line 310 and/or values of second line 320 to determine whether air filter 120 has remaining usable life.

In addition to determining whether air filter 120 no remaining usable life, this disclosure also recognizes that controller 140 can predict how dirty air filter 120 is. This prediction is referred to herein as a percent dirty (or soilage percentage) of air filter 120. In some embodiments, controller 140 determines percent dirty using the following formula:

$$\frac{PP_X - MP_X}{PP_X - SP_X}$$

wherein PPx indicates a predicted static pressure of HVAC system 100 along second line 310 (dirty line 310) at a given CFM, $MP_X$ indicates a measured static pressure of HVAC system 100 at the given CFM, and $SP_X$ indicates a predicted static pressure of HVAC system 100 along first line 100 (clean line 100) at a given CFM. In some embodiments, controller 140 determines percent dirty as above but substitutes $MP_{avg}$ for $MP_X$, wherein $MP_{avg}$ is equal to an average of samples in a data set. Although this disclosure describes and depicts using each value either predicted by an equation and/or measured by HVAC system 100, this disclosure recognizes that conventional scientific principles should be applied in evaluating these values. For example, controller 140 may be programmed to discard data which it determines are outliers.

Controller 140 may be further programmed to generate one or more additional alerts based on a soilage percentage of air filter 120. For example, controller 140 may be configured to generate an alert in response to determining that air filter 120 has a dirtiness percentage of 10% or less. Although this disclosure describes a specific alert threshold, this disclosure recognizes that this alert threshold may be set at any suitable percentage, and in some embodiments, may be set by an operator of HVAC system 100.

Figure 5:
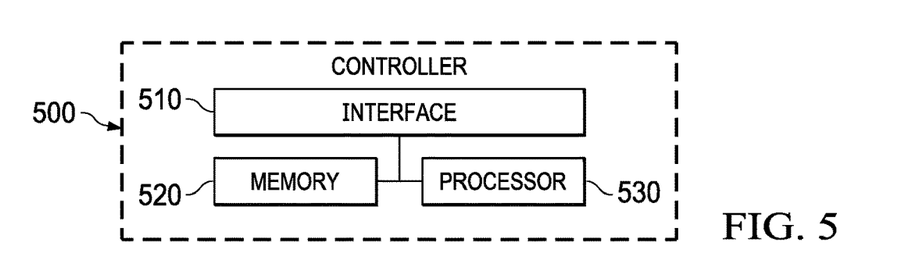
FIG. 5 illustrates an example of a controller for the refrigeration system of FIG. 1, according to certain embodiments.

FIG. 5 illustrates an example controller 140 of HVAC system 100, according to certain embodiments of the present disclosure. Controller 140 may comprise one or more interfaces 510, memory 520, and one or more processors 530. Interface 510 receives input (e.g., sensor data, user input), sends output (e.g., instructions), processes the input and/or output, and/or performs other suitable operation. Interface 510 may comprise hardware and/or software.

Processor 530 may include any suitable combination of hardware and software implemented in one or more modules to execute instructions and manipulate data to perform some or all of the described functions of controller 140. In some embodiments, processor 530 may include, for example, one or more computers, one or more central processing units (CPUs), one or more microprocessors, one or more applications, one or more application specific integrated circuits (ASICs), one or more field programmable gate arrays (FP-GAs), and/or other logic.

Memory (or memory unit) 520 stores information. Memory 520 may comprise one or more non-transitory, tangible, computer-readable, and/or computer-executable storage media. Examples of memory 520 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, the HVAC system may include any suitable number of compressors, condensers, condenser fans, evaporators, valves, sensors, controllers, and so on, as performance demands dictate. One skilled in the art will also understand that the HVAC system contemplated by this disclosure can include other components that are not illustrated but are typically included with HVAC systems. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A heating, ventilation, and air conditioning ("HVAC") system operable to condition an enclosed space, the HVAC system comprising:
   at least one blower operable to move air;
   an air filter configured entrap airborne pollutants;
   at least one controller operable to:
      initiate a filter calibration procedure in response to detecting installation of an air filter within the HVAC system, wherein:
         the air filter is configured to entrap airborne pollutants; and
         the filter calibration procedure comprises measuring a static pressure of the HVAC system at a plurality of predetermined points, each predetermined point being a specified flowrate of air moved by the at least one blower;
      curve fit a first line based on the static pressure measurements and the corresponding flowrates of air, the first line indicating values of static pressure and corresponding flowrates of air of a clean filter;
      generate a second line based on the first line, the second line indicating predicted values of static pressure and corresponding flowrates of air of a dirty filter;
      in response to determining that a first flowrate of air has been moved by the at least one blower, determine a first static pressure measurement of the HVAC system;
      compare the first static pressure measurement to a predicted static pressure value of the second line, the predicted static pressure value corresponding to the first flowrate of air; and
      in response to determining that the first static pressure measurement is greater than the predicted static pressure value, determine that the air filter has no more usable life.

2. The system of claim 1, wherein the controller is further operable to generate an alert in response to determining that the air filter has no more usable life.

3. The system of claim 1, wherein the filter calibration procedure comprises:
   in response to determining that a second flowrate of air has been moved by the at least one blower, determine a second static pressure value of the HVAC system;
   in response to determining that a third flowrate of air has been moved by the at least one blower, determine a third static pressure value of the HVAC system; and
   in response to determining that a fourth flowrate of air has been moved by the at least one bower, determine a fourth static pressure value of the HVAC system.

4. The HVAC system of claim 1, wherein the controller detects the installation of an air filter in response to detecting that a change filter button has been depressed.

5. The HVAC system of claim 1, wherein the processor is further operable to determine, in response to detecting that a change filter button has been depressed, that the air filter has 100% life.

6. The HVAC system of claim 1, wherein the processor is further operable to determine a dirtiness of the air filter as measured in percentage based on one or more of the first static pressure value, the predicted static pressure value of the second line, and a second predicted static pressure value, wherein the second predicted static pressure value is a static pressure value of the first line corresponding to the first flowrate of air.

7. The HVAC system of claim 6, wherein the processor is further operable to generate an alert in response to determining that the air filter has less than a threshold amount of life left.

8. The HVAC system of claim 1, wherein the predicted values of static pressure of the second line are scaled from one or more points along the first line.

9. The HVAC system of claim 1, wherein the air filter is installed within an air vent of the HVAC system.

10. A method comprising:
    initiating, by a controller of a heating, ventilation, and air conditioning ("HVAC") system, a filter calibration procedure in response to detecting installation of an air filter within the HVAC system, wherein:
        the air filter is configured to entrap airborne pollutants; and
        the filter calibration procedure comprises measuring a static pressure of the HVAC system at a plurality of predetermined points, each predetermined point being a specified flowrate of air moved by at least one blower of the HVAC system, the static pressure measured by at least one sensor of the HVAC system;
    curve fitting, by the controller, a first line based on the static pressure measurements and the corresponding flowrates of air, the first line indicating values of static pressure and corresponding flowrates of air of a clean filter;
    generating, by the controller, a second line based on the first line, the second line indicating predicted values of static pressure and corresponding flow rates of air of a dirty filter;
    in response to determining that a first flowrate of air has been moved by the at least one blower, determining, by the controller, a first static pressure measurement of the HVAC system;
    comparing, by the controller, the first static pressure measurement to a predicted static pressure value of the second line, the predicted static pressure value corresponding to the first flowrate of air; and
    in response to determining that the first static pressure measurement is greater than the predicted static pressure value, determining, by the controller, that an air filter of the HVAC system has no more usable life.

11. The method of claim 10, the method further comprising generating an alert in response to determining that the air filter has no more usable life.

12. The method of claim 10, wherein the filter calibration procedure comprises:
    in response to determining that a second flowrate of air has been moved by the at least one blower, determine a second static pressure value of the HVAC system;
    in response to determining that a third flowrate of air has been moved by the at least one blower, determine a third static pressure value of the HVAC system; and
    in response to determining that a fourth flowrate of air has been moved by the at least one blower, determine a fourth static pressure value of the HVAC system.

13. The method of claim 10, wherein the controller detects the installation of an air filter in response to detecting that a change filter button has been depressed.

14. The method of claim 10, the method further comprising:
    determining that the air filter has 100% life in response to detecting that a change filter button has been depressed.

15. The method of claim 10, the method further comprising:
    determining a dirtiness of the air filter as measured in percentage based on one or more of the first static pressure value, the predicted static pressure value of the second line, and a second predicted static pressure value, wherein the second predicted static pressure value is a static pressure value of the first line corresponding to the first flowrate of air.

16. The method of claim 10, the method further comprising:
    generating an alert in response to determining that the filter has less than a threshold amount of life left.

17. The method of claim 10, wherein the predicted values of static pressure of the second line are scaled from one or more points along the first line.

18. At least one controller of a heating, ventilation, and air conditioning ("HVAC") system, the at least one controller operable to:
    initiate a filter calibration procedure in response to detecting installation of an air filter within the HVAC system, wherein:
        the air filter is configured to entrap airborne pollutants; and
        the filter calibration procedure comprises measuring a static pressure of the HVAC system at a plurality of predetermined points, each predetermined point being a specified flowrate of air moved by at least one blower of the HVAC system, the static pressure measured by at least one sensor of the HVAC system;
    curve fit, by the controller, a first line based on the static pressure measurements and the corresponding flowrates of air, the first line indicating values of static pressure and corresponding flowrates of air of a clean filter;
    generate a second line based on the first line, the second line indicating predicted values of static pressure and corresponding flowrates of air of a dirty filter;
    in response to determining that a first flowrate of air has been moved by the at least one blower, determine a first static pressure measurement of the HVAC system;
    compare the first static pressure value to a predicted static pressure measurement of the second line, the predicted static pressure value corresponding to the first flowrate of air; and
    in response to determining that the first static pressure measurement is greater than the predicted static pressure value, determine that an air filter of the HVAC system has no more usable life.

19. The at least one controller of claim 18, wherein the at least one controller is thither operable to generate an alert in response to determining that the air filter has no more usable life.

20. The at least one controller of claim 18, wherein the filter calibration procedure comprises:
    in response to determining that a second flowrate of air has been moved by the at least one blower, determine a second static pressure value of the HVAC system;
    in response to determining that a third flowrate of air has been moved by the at least one blower, determine a third static pressure value of the HVAC system; and
    in response to determining that a fourth flowrate of air has been moved by the at least one blower, determine a fourth static pressure value of the HVAC system.

* * * * *